Nov. 25, 1952

C. GERST 2,619,208

POWER TAKE-OFF

Filed Nov. 23, 1949

INVENTOR.
CHRIS GERST
BY
Gustav A. Wolff
ATT.

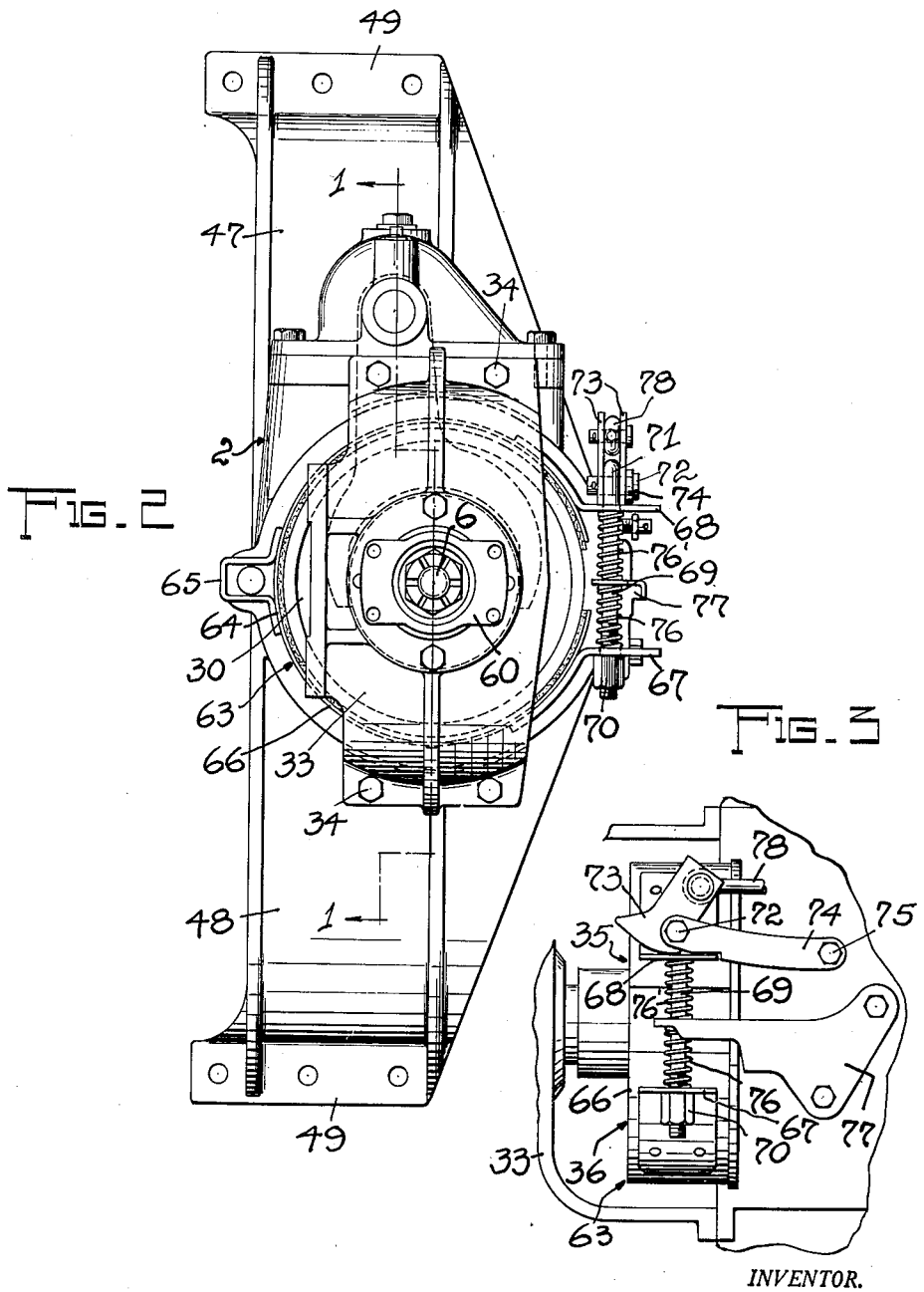

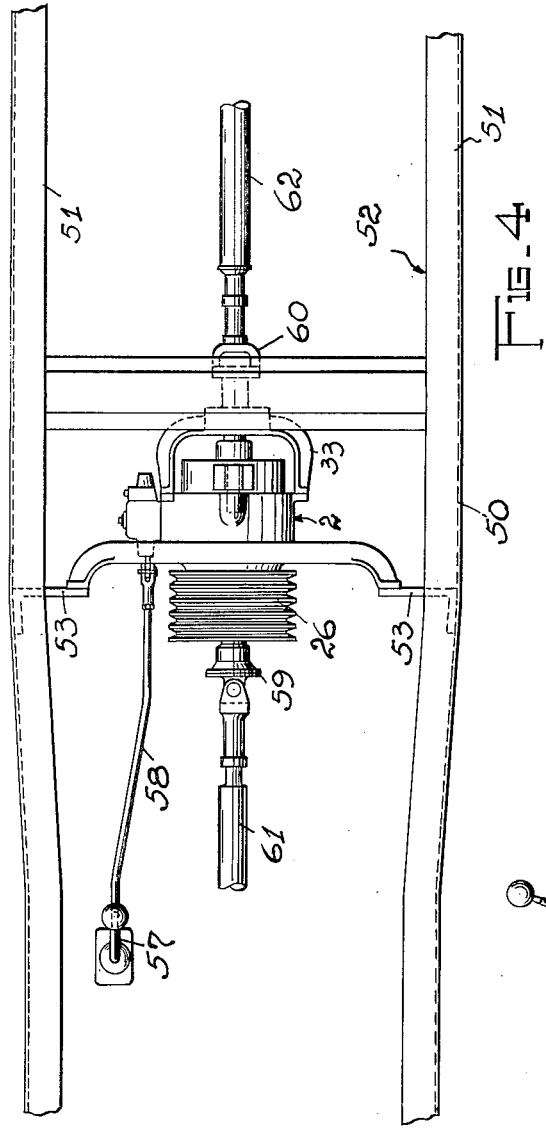

Patented Nov. 25, 1952

2,619,208

UNITED STATES PATENT OFFICE 2,619,208

POWER TAKE-OFF

Chris Gerst, Detroit, Mich., assignor to The Transmission & Gear Company, Dearborn, Mich., a corporation of Michigan Application November 23, 1949, Serial No. 129,013

1 Claim. (Cl. 192—48)

The present invention relates to power take-off devices for use on heavy duty motor vehicles such as self-propelled heavy duty trucks where power to drive various other devices is taken from the vehicle engine. Presently used power take-off devices of this type are constructed to form a part of the propeller shaft assembly of a motor vehicle, which assembly for such purpose is split into front and rear sections coupled with the driving and driven elements of the power take-off devices to provide proper driving connection between engine, rear axle and the output element of the power take-off devices.

The primary object of this invention is the provision of an improved power take-off device of the type indicated above constructed as a simple, compact and sturdy unit.

Another object of the invention is the provision of a power take-off unit constructed to form a part of the propeller drive assembly of a motor vehicle, and include shiftable coupling means for selectively coupling the driven elements of the unit with each other and effecting selective driving of the vehicle or other devices to be driven.

A further object of the invention is the provision of a power take-off unit of the type described above in which the driving and driven elements of the unit are arranged in axial alignment with respect to each other and partly intersleeved, and in which these elements are releasably coupled with each other by axially shiftable coupling means adapted to effect selective operation of the driven elements.

With the above and other incidental objects in view the invention has other marked improvements and superiorities which radically distinguish it from presently known structures. These improvements or superior characteristics, embodying certain novel features of construction, are clearly set forth in the appended claim; and a preferred embodiment of the invention is hereinafter shown with reference to the accompanying drawings forming part of the specification.

In the drawings:

Fig. 2 is an end view of the power take-off unit shown in Fig. 1;

Fig. 3 is a fragmentary side view;

Fig. 4 is a fragmentary plan view of a chassis frame of a motor vehicle with a power take-off unit of the type shown in Figs. 1 and 2 mounted on such chassis frame; and Fig. 5 is a side view of Fig. 4.

Figure 1:
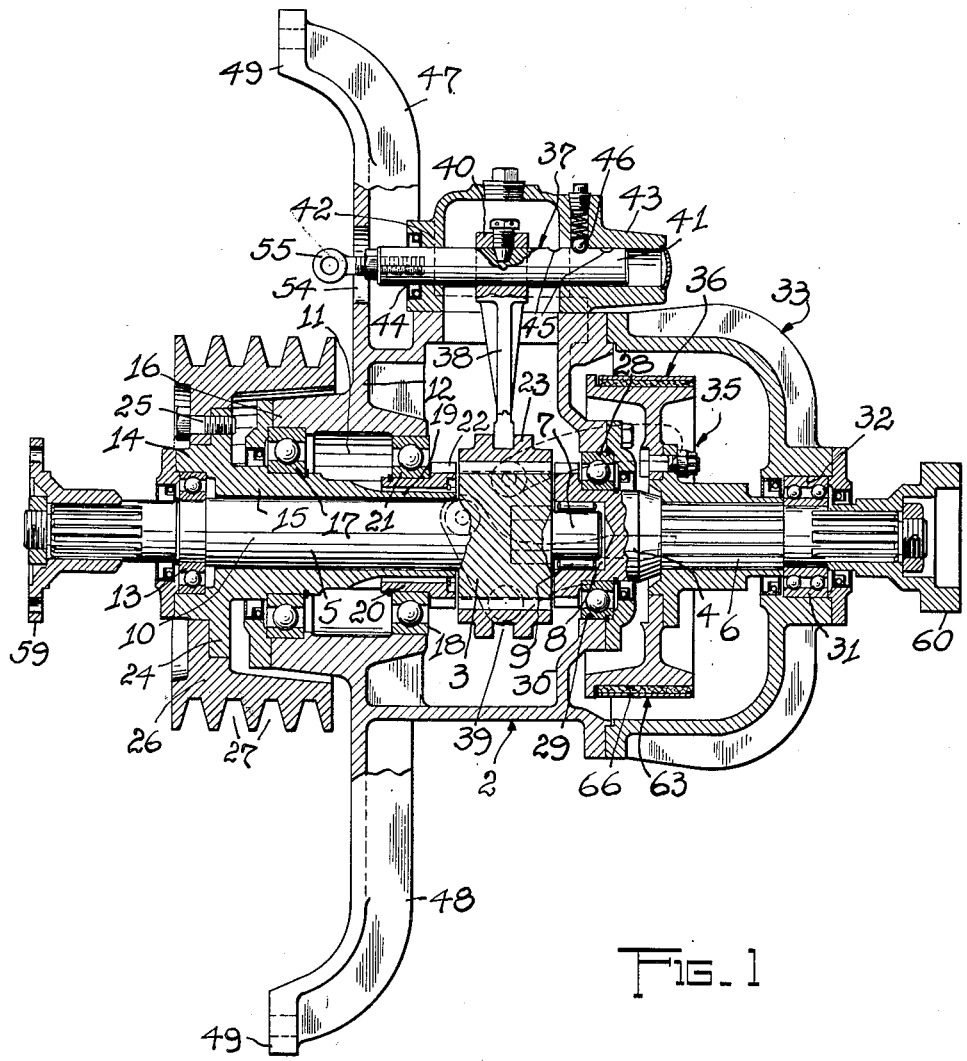
Fig. 1 is a longitudinal sectional view, partly in elevation, through a power take-off unit constructed in accordance with the invention, the section being taken on line 1—1 of Fig. 2.

Referring now more particularly to the power take-off unit disclosed in the drawing, reference numeral 2 denotes a housing having freely-rotatably mounted therein the opposed end portions 3 and 4 of two axially aligned shaft members 5 and 6 which have their opposed end portions freely-rotatably engaged with each other. Thus, shaft member 5, the end portion 3 of which is enlarged and circumferentially splined, has a cylindrical stub shaft portion 7 which extends into an axial bore 8 in the enlarged, circumferentially splined end portion 4 of shaft member 6. Preferably as shown, bore 8 mounts a roller bearing 9 into which stub shaft 7 extends. The other end 10 of shaft member 5 extends outwardly of housing 2 through a flanged bore 11 in end wall 12 of said housing and freely-rotatably supports on a ball bearing 13 one end portion 14 of a tubular shaft 15 extended through bore 11 into the housing and mounted in the flange 16 of said bore on ball bearings 17 and 18.

Tubular shaft 15 has its inner end 19 circumferentially splined and mounts a short sleeve member 20 internally splined for cooperation with the splined inner end 19 of said shaft which sleeve member mounts the inner ring 21 of ball bearing 18 and is externally splined as at 22 for cooperation with a shiftable coupling sleeve 23 as will be later described.

The tubular shaft 15 includes at its outer end portion 14 a peripheral flange 24 having attached thereto by bolts 25 a grooved cylinder member or drum 26, the V-shaped grooves 27 of which cooperate with V-shaped belts (not shown) in effecting driving of devices by the power take-off unit.

Shaft member 6 has its enlarged, splined inner end portion 4 freely-rotataby mounted in a ball bearing 28 arranged in a flanged bore 29 in the end wall 30 of housing 2 and extends through said bore outside of the housing, where such shaft member has its central portion freely-rotatably mounted in a double ball bearing 31 supported in a bore 32 of a fork-shaped bracket 33 attached to housing 2 by bolts 34. Shaft member 6 has its portion between ball bearings 28 and 31 circumferentially splined and mounts on this portion a brake drum structure 35 which cooperates with a brake band arrangement 36 in effecting a braking action on said shaft member as will be later described.

The shiftable coupling sleeve 23 is internally circumferentially splined and axially shiftably mounted on the enlarged, circumferentially splined end portion 3 of shaft member 5. This sleeve member, the externally splined portion 22 of sleeve member 20 and the externally splined portion 4 of shaft member 6 are dimensioned and splined for cooperation with coupling sleeve member 23, so that shifting of coupling sleeve 23 selectively effects coupling of shaft 5 with shaft 6 or tubular shaft 15, which latter shaft mounts the grooved cylinder member 26.

Shifting of the coupling sleeve 23 in opposite directions is effected by a shiftable sleeve actuating mechanism 37 including a fork-shaped shifting member 38 which engages a groove 39 in coupling sleeve 23. This fork-shaped shifting member embodies a bearing portion 40 sleeved upon and secured to a shifting rod 41 which is slidably mounted in bearings 42 and 43 of housing 2 and outwardly extended at 44 to permit operating of the power take-off unit and effect direct drive of shaft 6 by shaft 5 or drive of tubular shaft 15 by the latter shaft. The shifting rod 41 includes a plurality of indentations 45 which cooperate with a spring pressed ball 46 in retaining the shifting rod in the desired position.

Housing 2, as shown, includes lateral ribbed wing portions 47, 48 provided at their outer ends with flanges 49 permitting attachment of said housing to the web portions 50 of the side rails 51 of a chassis frame 52 by means of angle plates 53 (see Figs. 4 and 5). The wing portion 47 includes an opening 54 for the longitudinally adjustably mounted eye bolt 55 threadedly extended into a bore in shifting rod 41, which eye bolt is linked to the lower arm 56 of a hand lever 57 by a link member 58.

The outer ends of shaft members 5 and 6 are coupled by suitable couplings 59 and 60, respectively, with the shaft sections 61 and 62 coupled with the main transmission and rear axle of the vehicle, not shown.

The brake band arrangement 36 embodies a brake band 63 having its middle portion 64 secured to housing 2, a bracket 65 being used for such purpose. This brake band has attached to its steel backing member 66 perforated brackets 67, 68 through the perforations of which a tensioning rod 69 extends. Rod 69 mounts at one end an adjusting nut 70 seated against the outer face of the bracket 67 and has its other end formed with an eye 71 for a bolt 72 seating a pair of cam members 73 adapted to engage the outside face of the bracket 68 and effect clamping of brake band 63 around brake drum structure 35. A link 74 connected to housing 2 at 75 and bolt 72 insures proper position of the cam members during braking action, and a pair of compression springs 76, 76' on rod 69 and seated between the brackets 67, 68 and a bracket member 77 secured to housing 2 insures proper opening up of the brake band when the brake band operating rod 78 pivoted to cam members 73 is released.

The thus described power take-off unit which when attached to a truck chassis or frame structure in the manner delineated previously, has its weight properly and symmetrically distributed with respect to the axis of the frame, permits individual operation of the truck or any other device to be driven by shifting the coupling sleeve to the desired position and, in addition, provides a braking structure adapted to effectively and economically effect proper braking action on the vehicle while at a standstill and travelling.

Having thus described my invention, what I claim is:

In a power take-off for motor vehicles and similar devices, a housing, flanged openings in opposed walls of said housing, two shaft sections and a tubular shaft axially aligned with each other, rotatably supported in said flanged openings and outwardly extended from said housing, and coupling means adapted to selectively couple the opposed inner ends of said shaft sections and tubular shaft, said housing having extended from one of its opposed walls symmetrically arranged arms adapted to support the housing and mounting on its other one of the opposed walls a U-shaped bracket, and bearing means in the web portion of said bracket, said bearing means having one of said shaft sections journaled therein and extended therethrough.

CHRIS GERST.

REFERENCES CITED

The following references are of record in the file of this patent:

UNITED STATES PATENTS

| Number | Name | Date |
| --- | --- | --- |
| 1,755,432 | Dean | Apr. 22, 1930 |
| 1,899,247 | Schultze | Feb. 28, 1933 |
| 2,055,887 | Yager | Sept. 29, 1936 |
| 2,062,194 | Smith | Nov. 24, 1936 |
| 2,121,897 | Wood | June 28, 1938 |
| 2,139,198 | Miller | Dec. 6, 1938 |
| 2,213,196 | Bartholomew | Sept. 3, 1940 |